(12) United States Patent
Orihara et al.

(10) Patent No.: US 11,470,097 B2
(45) Date of Patent: Oct. 11, 2022

(54) PROFILE GENERATION DEVICE, ATTACK DETECTION DEVICE, PROFILE GENERATION METHOD, AND PROFILE GENERATION COMPUTER PROGRAM

(71) Applicant: NIPPON TELEGRAPH AND TELEPHONE CORPORATION, Tokyo (JP)

(72) Inventors: Shingo Orihara, Musashino (JP); Tohru Sato, Musashino (JP); Yohsuke Shimada, Musashino (JP); Yang Zhong, Musashino (JP); Yuta Iwaki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 354 days.

(21) Appl. No.: 16/490,352

(22) PCT Filed: Feb. 16, 2018

(86) PCT No.: PCT/JP2018/005601
§ 371 (c)(1),
(2) Date: Aug. 30, 2019

(87) PCT Pub. No.: WO2018/159337
PCT Pub. Date: Sep. 7, 2018

(65) Prior Publication Data
US 2020/0012784 A1 Jan. 9, 2020

(30) Foreign Application Priority Data
Mar. 3, 2017 (JP) .............................. JP2017-041124

(51) Int. Cl.
*H04L 9/40* (2022.01)
*G06F 21/55* (2013.01)

(52) U.S. Cl.
CPC ........ *H04L 63/1416* (2013.01); *G06F 21/552* (2013.01); *G06F 21/554* (2013.01); *H04L 63/0245* (2013.01); *H04L 63/1425* (2013.01)

(58) Field of Classification Search
CPC ............. H04L 63/1416; H04L 63/1425; H04L 63/0245; H04L 67/02; G06F 21/55; G06F 21/552; G06F 21/554
See application file for complete search history.

(56) References Cited

U.S. PATENT DOCUMENTS 10,104,113 B1 * 10/2018 Stein ................... H04L 63/1425
10,547,627 B2 * 1/2020 Xu ........................ H04L 63/145
(Continued)

FOREIGN PATENT DOCUMENTS

WO   2015/114804 A1   8/2015
WO   2015/186662 A1   12/2015

OTHER PUBLICATIONS

Zolotukhin, Mikhail; Hamalainen, Timo; Kokkonen, Tero; Siltanen, Jarmo; "Analysis of HTTP Requests for Anomaly Detection of Web Attacks", 12th International Conference on Dependable, Autonomic and Secure Computing, IEEE, Aug. 24-27, 2014, pp. 406-411.*
(Continued)

*Primary Examiner* — Victor Lesniewski
(74) *Attorney, Agent, or Firm* — Xsensus LLP

(57) ABSTRACT

A global profile generation unit acquires a profile including, as an entry, information on parameter values for a combination of path parts and parameter names included in a normal HTTP request to a web server. When entries, in which the path parts are different but the parameter names are the same, are present in the acquired profile, the global profile generation unit generates a global profile in which the entries of the parameter names are aggregated in the acquired profile.

9 Claims, 11 Drawing Sheets

(56) References Cited

U.S. PATENT DOCUMENTS

| | | | |
|---|---|---|---|
| 10,693,901 B1* | 6/2020 | Chan | H04L 63/1433 |
| 2005/0120054 A1* | 6/2005 | Shulman | G06F 21/577 |
| 2005/0188215 A1* | 8/2005 | Shulman | H04L 69/22 |
| | | | 713/188 |
| 2005/0265331 A1* | 12/2005 | Stolfo | H04L 63/0245 |
| | | | 370/389 |
| 2011/0283361 A1* | 11/2011 | Perdisci | G06F 21/56 |
| | | | 726/24 |
| 2015/0026808 A1* | 1/2015 | Perdisci | H04L 63/145 |
| | | | 726/23 |
| 2016/0226976 A1* | 8/2016 | Ciabarra, Jr. | H04L 67/02 |
| 2017/0126724 A1 | 5/2017 | Zhong et al. | |
| 2017/0134407 A1* | 5/2017 | Mason | H04L 63/1416 |
| 2017/0264626 A1* | 9/2017 | Xu | H04L 63/145 |
| 2017/0270299 A1* | 9/2017 | Kim | G06N 5/022 |
| 2017/0339168 A1* | 11/2017 | Balabine | H04L 63/1416 |
| 2018/0046800 A1* | 2/2018 | Aoki | G06F 21/56 |
| 2018/0103055 A1* | 4/2018 | Keohane | H04L 63/1433 |
| 2018/0121558 A1* | 5/2018 | Huang | H04L 61/457 |

OTHER PUBLICATIONS

Chwalinski, Pawel; Belavkin, Roman; Cheng, Xiaochun; "Detection of application layer DDoS attack with clustering and likelihood analysis", Globecom Workshops (GC Wkshps), IEEE, Dec. 9-13, 2013, pp. 217-222.*

Hazel, J. Jemi; Valarmathie, P.; Saravanan, R.; "Guarding web application with multi—Angled attack detection", International Conference on Soft-Computing and Networks Security (ICSNS), IEEE, Feb. 25-27, 2015, 4 pages.*

International Search Report and Written Opinion dated Apr. 17, 2018 for PCT/JP2018/005601 filed on Feb. 16, 2018, 6 pages including English Translation of the International Search Report.

* cited by examiner

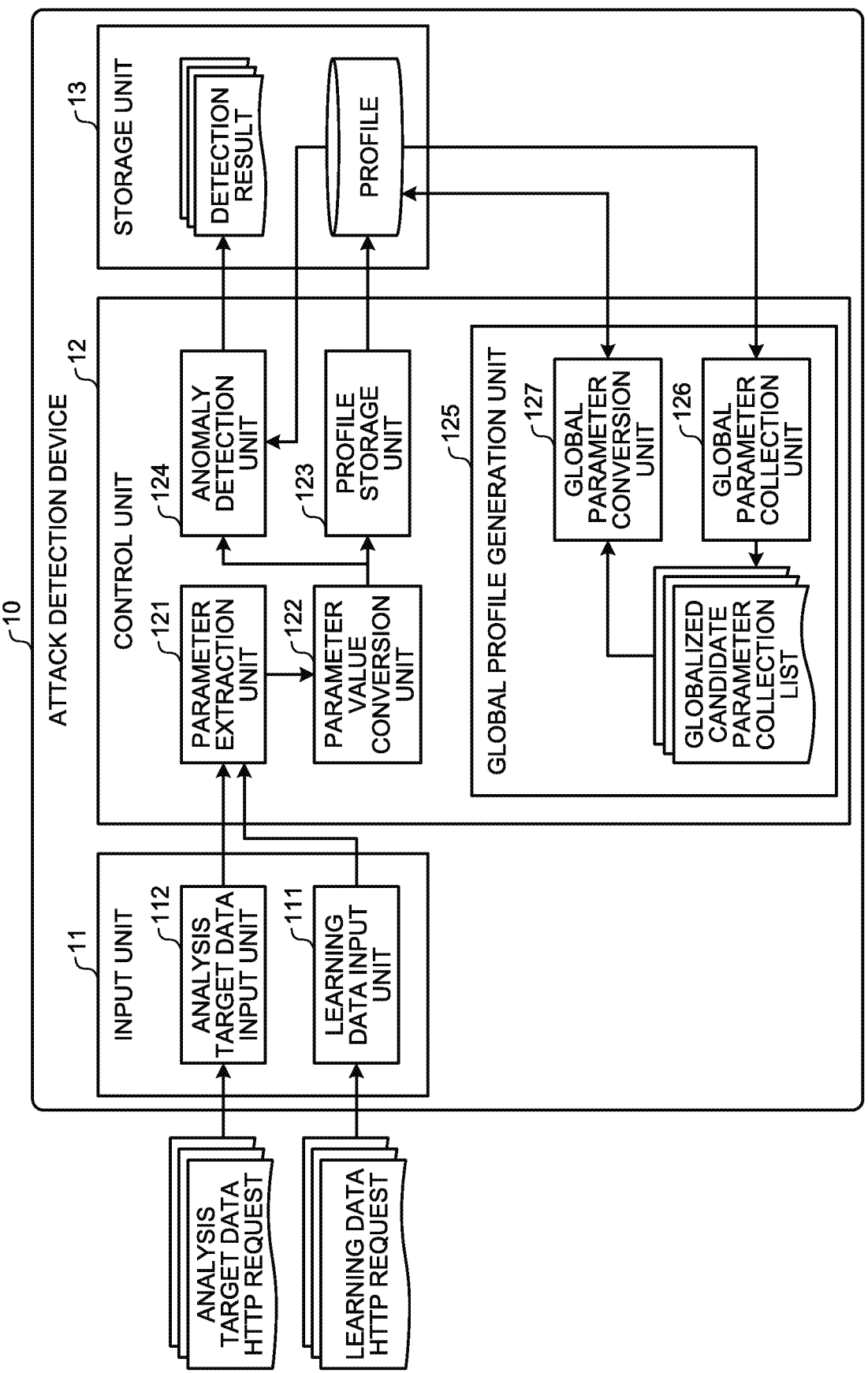

FIG.2

HTTP REQUEST OF LEARNING DATA

```
12/1 0:01:30  192.168.0.1  GET  /index.php?id=user001
12/1 0:01:34  192.168.0.1  GET  /index.php?id=user001&cc=jp
12/1 0:01:30  192.168.0.1  GET  /dynamic001.php?file=img001.jpg
12/1 0:01:34  192.168.0.1  GET  /dynamic002.php?file=img002-a.jpg
```

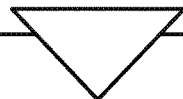

PROFILE (AFTER GLOBAL PARAMETER CONVERSION PROCESS)

| PATH PART | PARAMETER | CHARACTER CLASS SEQUENCE | NUMBER OF APPEARANCES |
|---|---|---|---|
| /index.php | id | (AL, NU) | 2 |
| /index.php | cc | (AL) | 1 |
| * | file | (AL, NU, SY, AL) | 1 |
| * | file | (AL, NU, SY, AL, SY, AL) | 1 |

FIG.3

HTTP REQUEST OF LEARNING DATA

```
12/1 0:01:30  192.168.0.1  GET  /index.php?id=user001
12/1 0:01:34  192.168.0.1  GET  /index.php?id=user001&cc=jp
12/1 0:01:30  192.168.0.1  GET  /dynamic001.php?file=img001.jpg
12/1 0:01:34  192.168.0.1  GET  /dynamic002.php?file=img002-a.jpg
```

PROFILE (BEFORE GLOBAL PARAMETER CONVERSION PROCESS)

| PATH PART | PARAMETER | CHARACTER CLASS SEQUENCE | NUMBER OF APPEARANCES |
|---|---|---|---|
| /index.php | id | (AL, NU) | 2 |
| /index.php | cc | (AL) | 1 |
| /dynamic001.php | file | (AL, NU, SY, AL) | 1 |
| /dynamic002.php | file | (AL, NU, SY, AL, SY, AL) | 1 |

FIG.4

(1) REGULAR EXPRESSION EXAMPLE OF CHARACTER CLASSES

```
"numeric" : "[0-9]+", "hex" : "[0-9a-fA-F]+", "alpha" : "[a-zA-Z]+",
"space" : "[ ]+", "quote" : "[¥"¥']+", "pair" : "[¥(¥)¥[¥]<>]+",
"symbol" : "[¥!¥#¥$¥%¥&¥*¥+¥,¥-¥.¥/¥:¥;¥=¥?¥@¥^¥_¥|¥`]+",
"control" : "[¥x00-¥x1f|¥x7f]+",
"noascii" : "[¥x80-¥xff]+", "multi_byte" : u"[¥u0100-¥uffff]+",
"url" : "http://[0-9a-z¥.]+", "ip" : ... , "path" : ... , "mac" : ... , ...
``` img.jpg         ⇒  (img,.,jpg)         ⇒  (alpha, symbol, alpha)
top001.png         (top,001,.,png)         (alpha, numeric, symbol, alpha)

(2)

|  | FREQUENCY OF APPEARANCE |
|---|---|
| (alpha, symbol, alpha) | : 100 |
| (alpha, numeric, symbol, alpha) | : 50 |
| (alpha) | : 1 |

→ PROFILE (alpha, symbol, alpha)

FIG.5

EXAMPLE OF PROFILE

| PATH PART | PARAMETER | CHARACTER CLASS SEQUENCE | NUMBER OF APPEARANCES |
|---|---|---|---|
| /index.php | id | (AL, NU) | 200 |
|  |  | (AL) | 100 |
| /index.php | cc | (AL) | 100 |
| /dynamic001.php | file | (AL, NU, SY, AL) | 1 |
| /dynamic002.php | file | (AL, NU, SY, AL) | 1 |
| ⋮ | ⋮ | ⋮ | ⋮ |

AL: CHARACTER CLASS (alpha) REPRESENTING ALPHABET
NU: CHARACTER CLASS (numeric) REPRESENTING NUMERIC
SY: CHARACTER CLASS (symbol) REPRESENTING SYMBOL

FIG.6

(1) CONVERT PARAMETER VALUE OF HTTP REQUEST OF ANALYSIS TARGET DATA INTO CHARACTER CLASS SEQUENCE
(2) CALCULATE SIMILARITY WITH CHARACTER CLASS SEQUENCE OF PROFILE BY EQUATION (1)

X: LENGTH OF CHARACTER CLASS SEQUENCE OF PROFILE
Y: LENGTH OF CHARACTER CLASS SEQUENCE OF ANALYSIS TARGET DATA
Z: LENGTH OF LONGEST COMMON SUBSEQUENCE (LCS) BETWEEN CHARACTER CLASS SEQUENCE OF PROFILE AND CHARACTER CLASS SEQUENCE OF ANALYSIS TARGET DATA $$\text{SIMILARITY } S = \frac{Z}{X+Y-Z} \quad \cdots \text{EQUATION (1)}$$

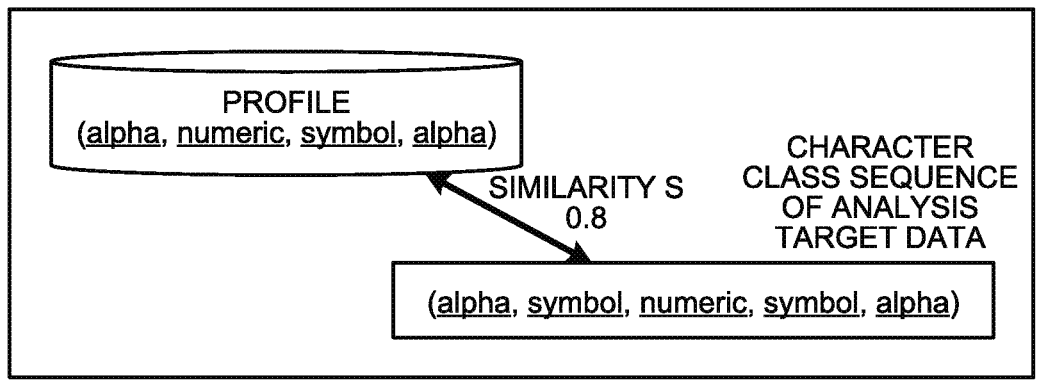

CALCULATE SIMILARITY WITH PROFILE (3) WHEN SIMILARITY S IS SMALLER THAN THRESHOLD VALUE St, DETERMINED AS ANOMALY

FIG.7

PROFILE (BEFORE GLOBAL PARAMETER CONVERSION PROCESS)

| PATH PART | PARAMETER | CHARACTER CLASS SEQUENCE | NUMBER OF APPEARANCES |
|---|---|---|---|
| /index.php | id | (AL, NU) | 2 |
| /index.php | cc | (AL) | 1 |
| /dynamic001.php | file | (AL, NU, SY, AL) | 1 |
| /dynamic002.php | file | (AL, NU, SY, AL, SY, AL) | 1 |

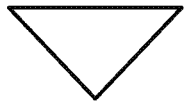

GLOBALIZED CANDIDATE PARAMETER COLLECTION LIST

| PARAMETER | PATH PART IN WHICH PARAMETER APPEARS | NUMBER OF TYPES OF PATH PART |
|---|---|---|
| id | /index.php | 1 |
| cc | /index.php | 1 |
| file | /dynamic001.php /dynamic002.php | 2 |

FIG.8

GLOBALIZED CANDIDATE PARAMETER COLLECTION LIST

| PARAMETER | PATH PART IN WHICH PARAMETER APPEARS | NUMBER OF TYPES OF PATH PART |
|---|---|---|
| id | /index.php | 1 |
| cc | /index.php | 1 |
| file | /dynamic001.php<br>/dynamic002.php | 2 |

~801

<WHEN THRESHOLD VALUE OF NUMBER OF TYPES OF PATH PART IS 2>

SINCE NUMBER OF TYPES OF PATH PART IS SMALLER THAN THRESHOLD VALUE OF NUMBER OF TYPES OF PATH PART, GLOBALIZATION IS DETERMINED NOT TO BE NEEDED

SINCE NUMBER OF TYPES OF PATH PART IS EQUAL TO OR MORE THAN THRESHOLD VALUE OF NUMBER OF TYPES OF PATH PART, GLOBALIZATION IS DETERMINED TO BE NEEDED

FIG.9

PROFILE (BEFORE GLOBAL PARAMETER CONVERSION PROCESS)

| PATH PART | PARAMETER | CHARACTER CLASS SEQUENCE | NUMBER OF APPEARANCES |
|---|---|---|---|
| /index.php | id | (AL, NU) | 2 |
| /index.php | cc | (AL) | 1 |
| /dynamic001.php | file | (AL, NU, SY, AL) | 1 |
| /dynamic002.php | file | (AL, NU, SY, AL, SY, AL) | 1 |

901
902
903

PARAMETER NEEDED TO BE GLOBALIZED

INHERIT

SUM

PROFILE (AFTER GLOBAL PARAMETER CONVERSION PROCESS)

| PATH PART | PARAMETER | CHARACTER CLASS SEQUENCE | NUMBER OF APPEARANCES |
|---|---|---|---|
| /index.php | id | (AL, NU) | 2 |
| /index.php | cc | (AL) | 1 |
| /index.php | file | (AL, NU, SY, AL) | 1 |
| * | | (AL, NU, SY, AL, SY, AL) | 2 |

PROFILE (BEFORE GLOBAL PARAMETER CONVERSION PROCESS)

| PATH PART | PARAMETER | CHARACTER CLASS SEQUENCE | NUMBER OF APPEARANCES |
|---|---|---|---|
| /index.php | id | (AL, NU) | 2 |
| /index.php | cc | (AL) | 1 |
| /dynamic001.php | file | (AL, NU, SY, AL) | 1 |
| /dynamic001.php | file | (AL, NU, SY, AL, SY, AL) | 1 |
| /dynamic002.php | file | (AL, NU, SY, AL, SY, AL) | 1 |

1101
1102

PARAMETER NEEDED TO BE GLOBALIZED

AGGREGATE & SUM

PROFILE (AFTER GLOBAL PARAMETER CONVERSION PROCESS)

| PATH PART | PARAMETER | CHARACTER CLASS SEQUENCE | NUMBER OF APPEARANCES |
|---|---|---|---|
| /index.php | id | (AL, NU) | 2 |
| /index.php | cc | (AL) | 1 |
| * | file | (AL, NU, SY, AL) | 3 |

PROFILE (BEFORE GLOBAL PARAMETER CONVERSION PROCESS)

| PATH PART | PARAMETER | CHARACTER CLASS SEQUENCE | NUMBER OF APPEARANCES | APPEARANCE RATIO |
|---|---|---|---|---|
| /index.php | id | (AL, NU) | 2 | 2% |
| /index.php | cc | (AL) | 1 | 1% |
| /dynamic001.php | file | (AL, NU, SY, AL) | 50 | 50%(50/100) |
| /dynamic001.php | file | (AL, NU, SY, AL, SY, AL) | 49 | 49%(49/100) |
| /dynamic002.php | file | (AL, SP, SY, SY, AL, SP, SY, AL) | 1 | 1%(1/100) |

PARAMETER NEEDED TO BE GLOBALIZED

<WHEN THRESHOLD VALUE FOR APPEARANCE RATIO IS 5%>

1201 → AGGREGATION TARGET
1202 → AGGREGATION TARGET
1203 → NON-AGGREGATION TARGET

# PROFILE GENERATION DEVICE, ATTACK DETECTION DEVICE, PROFILE GENERATION METHOD, AND PROFILE GENERATION COMPUTER PROGRAM

CROSS-REFERENCE TO RELATED APPLICATIONS

The present application is based on PCT filing PCT/JP2018/005601, filed Feb. 16, 2018, which claims priority to JP 2017-041124, filed Mar. 3, 2017, the entire contents of each are incorporated herein by reference.

FIELD

The present invention relates to a technology related to network security, and more particularly, relates to a technology of analyzing and detecting access to attack a web server and a web application.

BACKGROUND

With the spread of the Internet, attacks on web servers are increasing rapidly. Countermeasures against the attacks include a detection and defending system against unauthorized intrusion into a network by an intrusion detection system (IDS), an intrusion prevention system (IPS), a web application firewall (WAF), and the like. Since this type of systems detects attacks with patterns using a blacklist or a signature file, there is a problem in that it is possible to detect or defend only known attacks.

On the other hand, as a technology of detecting an unknown attack, there is an anomaly detection technology. The anomaly detection technology is a technology of learning the characteristics (profile) of parameter values of a normal access request to a web server, comparing the learned characteristics with the characteristics of an access request to be detected, and determining whether the access request to be detected is an attack (not a normal access request).

For example, as the anomaly detection technology, there is a technology of learning, as a profile, information (a character class sequence) abstracted from a character string structure of parameter values for each combination of path parts and parameters in a normal hypertext transfer protocol (HTTP) request to a web server, calculating similarity with the character class of parameter values of an HTTP request to be identified, and determining whether the HTTP request to be identified is an attack (see Patent Literature 1). According to such a technology, it is possible to reduce the possibility of detecting (erroneously detecting) a normal HTTP request, which includes a parameter value not included in the profile or includes a parameter value with a highly flexible character string, as an attack.

CITATION LIST

Patent Literature

Patent Literature 1: International Publication No. 2015-186662

SUMMARY

Technical Problem

However, in the aforementioned anomaly detection technology, it is not possible to generate an appropriate profile in the case of a web application in which path parts of an HTTP request to a web server (a site) are dynamically generated.

For example, for each path part dynamically generated, when the parameter values of parameters of the path parts are learned and a profile is generated, the number of types of parameter values for parameters to be learned in the profile is insufficient. Furthermore, when an attack is detected with the profile in which the number of types is insufficient, erroneous detection for a normal HTTP request may frequently occur.

Furthermore, there is also a case where the dynamically generated path part is generated only once depending on the specifications of a web application. Therefore, the path part may change in the HTTP request every time a user accesses a web server. In such a case, even though the parameter values of parameters of the path parts are learned and the profile is generated, since a corresponding path part is not present in the profile during detection, an attack may be missed.

Moreover, when a parameter for the dynamically generated path parts is learned for each path part, the size of the profile also increases proportionally to an increase in the number of types of the generated path part. As a consequence, a time required for collating an HTTP request to be detected and the profile may increase and system performance may be reduced.

In this regard, the present invention has been made to solve the aforementioned problems, and an object of the present invention is to detect an attack with accuracy and efficiency even for a web application in which a path part is dynamically generated in a request.

Solution to Problem

To solve the above-described problems, the present invention is a profile generation device that generates a profile indicating characteristics of a request to a web server, the request being a detection target, the profile generation device comprising: an acquisition unit configured to acquire profile information including a combination of path parts and parameters included in a request that is learning data; and a profile generation unit configured to, when a group of the acquired profile information includes a predetermined number or more of profile information in which the path parts are different but similarity between names of the parameters is equal to or more than a predetermined value, generate a profile in which the group of the profile information is aggregated.

Advantageous Effects of Invention

According to the present invention, it is possible to detect an attack with accuracy and efficiency even for a web application in which a path part is dynamically generated in a request.

BRIEF DESCRIPTION OF DRAWINGS

FIG. 1 is a diagram illustrating a configuration of an attack detection device including a profile generation device of an embodiment.

FIG. 2 is a diagram illustrating an example in which a profile (after a global parameter conversion process) is generated from learning data.

FIG. 3 is a diagram illustrating an example in which a profile (before the global parameter conversion process) is generated from the learning data.

FIG. 4 is a diagram for explaining conversion of a parameter value to a character class sequence and storage of the parameter value in the profile in the attack detection device of FIG. 1.

FIG. 5 is a diagram illustrating an example of a profile before the global parameter conversion process.

FIG. 6 is a diagram for explaining the detection of an attack (anomaly) in the attack detection device of FIG. 1.

FIG. 7 is a diagram for explaining the generation of a globalized candidate parameter collection list by a global parameter collection unit of FIG. 1.

FIG. 8 is a diagram for explaining the determination of parameter globalization by a global parameter conversion unit of FIG. 1.

FIG. 9 is a diagram for explaining profile update by the global parameter conversion unit of FIG. 1.

FIG. 11 is a diagram for explaining the aggregation of a character class sequence in an attack detection device of a second embodiment.

FIG. 12 is a diagram for explaining the aggregation of a character class sequence in an attack detection device of a third embodiment.

DESCRIPTION OF EMBODIMENTS

Figure 10:
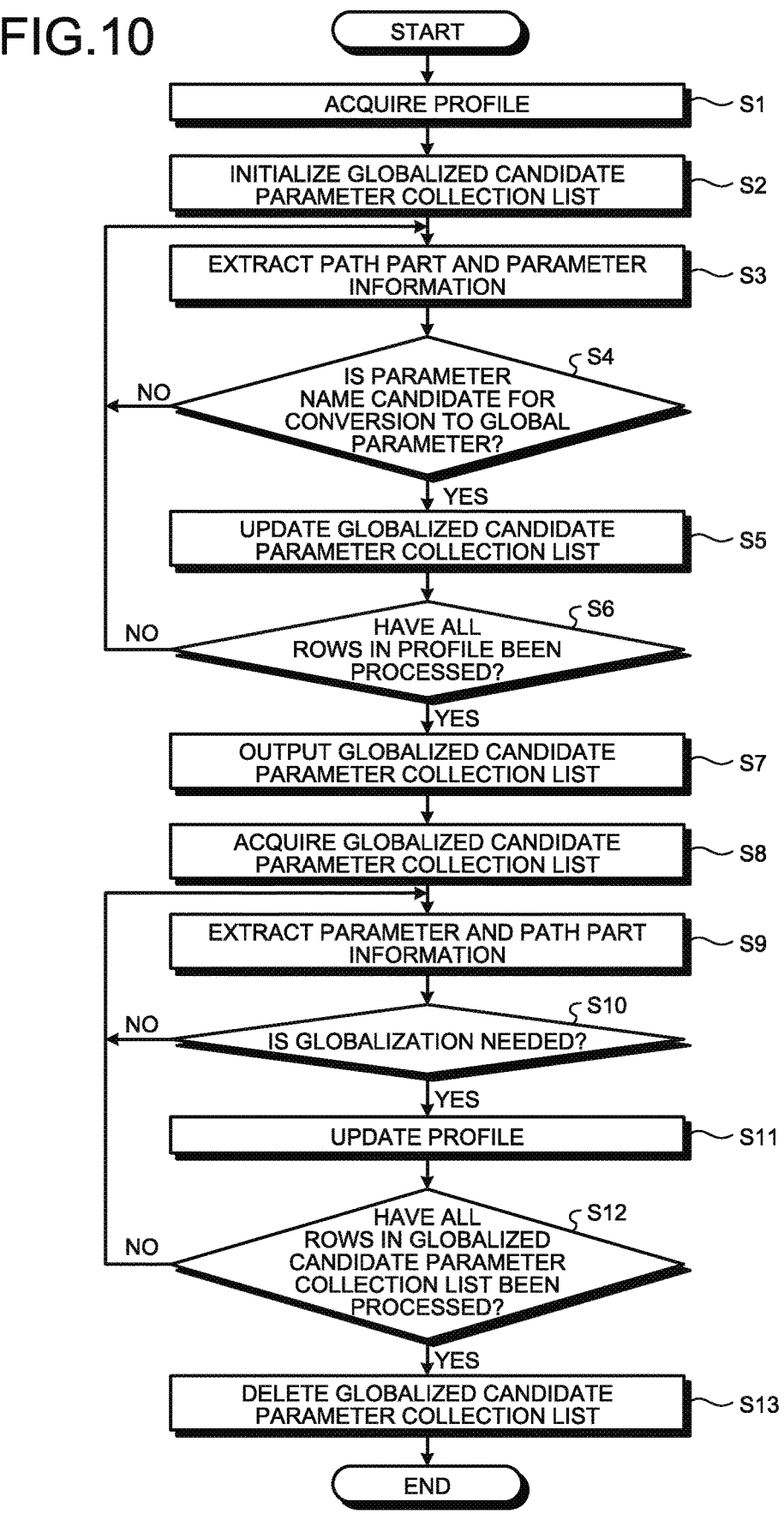
FIG. 10 is a flowchart illustrating an example of a processing procedure when the attack detection device of FIG. 1 generates a global profile.

Hereinafter, with reference to the drawings, embodiments of the present invention will be described by dividing them into a first embodiment to a third embodiment. The present invention is not limited to the following embodiments.

First Embodiment

Overview

The overview of an attack detection device 10 including a profile generation device (a global profile generation unit 125) of the first embodiment will be described using FIG. 1 to FIG. 3.

In addition, a case in which learning data and analysis target data (data that is an attack detection target) by the attack detection device 10 are HTTP requests to a web server (site) will be provided as an example.

Furthermore, a case where the attack detection device 10 performs what is called anomaly detection will be described as an example. Furthermore, for each combination of path parts and names of parameters (parameter names) included in a normal HTTP request, the attack detection device 10 uses information, which indicates information (parameter value information) indicating the parameter values of the parameters, as a profile (profile information) to be used in the detection. In addition, a case where the attack detection device 10 uses, as the parameter value information, a character class sequence (which will be described later) abstracted from the structure of a character string of the parameter values will be described as an example.

First, the attack detection device 10 illustrated in FIG. 1 generates a profile indicating the characteristics of a normal HTTP request on the basis of an HTTP request of learning data. Then, when input of an HTTP request, which is analysis target data, is received, the attack detection device 10 determines whether the HTTP request is a normal HTTP request by comparing the HTTP request with the profile.

For each combination of path parts and names of parameters included in the normal HTTP request, the attack detection device 10, for example, generates information, which indicates the character class sequence of parameter values of the parameters, as a profile on the basis of the normal HTTP request that is the learning data.

If there is a parameter (a global parameter) with different path parts but the same name in the HTTP request of the learning data when the profile is generated, the attack detection device 10 generates information indicating a character class sequence of the global parameter (see FIG. 2).

The character class sequence is a sequence in which characters constituting a parameter value are classified into classes such as AL (a character class (alpha) representing an alphabet), NU (a character class (numeric) representing a numeral), or SY (a character class (symbol) representing a symbol) and the classification results are arranged according to the arrangement of character strings.

For example, the attack detection device 10 generates a profile indicating character class sequences of parameter values (a profile before a global parameter conversion process illustrated in FIG. 3) from an HTTP request of learning data illustrated in FIG. 3, for each combination of path parts and parameter names included in the HTTP request. Then, the attack detection device 10 generates a profile (a profile after the global parameter conversion process), in which entries of a global parameter (for example, a parameter "file" in FIG. 2) are aggregated, in the profile (see FIG. 2).

As described above, the attack detection device 10 generates the profile in which the entries of the parameter with different path parts but the same name are aggregated. In this way, even when an HTTP request in which a path part dynamically changes is used in learning data, the attack detection device 10 can solve the insufficiency of the number of types of parameter values for the combinations of path parts and parameter names in the profile. As a consequence, the attack detection device 10 can reduce erroneous detection in attack detection using the profile. Furthermore, the attack detection device 10 can generate a profile applicable to a path part that is generated only once, so that it is possible to reduce the missing of an attack by using the profile. Moreover, the attack detection device 10 can reduce the size of the profile, so that it is possible to reduce a time required for collating an HTTP request to be analyzed and the profile.

Configuration

The configuration of the attack detection device 10 will be described using FIG. 1. The attack detection device 10 includes an input unit 11, a control unit 12, and a storage unit 13.

The input unit 11 has a learning data input unit (acquisition unit) 111 and an analysis target data input unit 112. The learning data input unit 111 receives a normal HTTP request to a web server (not illustrated) as learning data. The analysis target data input unit 112 receives input of an HTTP request that is analysis target data.

The control unit 12 includes a parameter extraction unit 121, a parameter value conversion unit 122, a profile storage unit 123, an anomaly detection unit 124, and a global profile generation unit 125.

The parameter extraction unit 121 extracts path parts, parameter names, and parameter values from the HTTP request of the learning data. Furthermore, the parameter extraction unit 121 extracts path parts, parameter names, and parameter values from the HTTP request of the analysis target data.

The parameter value conversion unit 122 converts the parameter values of the HTTP request of the learning data extracted by the parameter extraction unit 121 into character class sequences. Furthermore, the parameter value conversion unit 122 converts the parameter values of the HTTP request of the analysis target data extracted by the parameter extraction unit 121 into character class sequences.

For example, the parameter value conversion unit 122 refers to the regular expression of character classes prepared in advance, determines the longest matched part of the parameter value as one class, and performs a conversion to a character class sequence.

One example will be described. Hereinafter, a case where a parameter value extracted from the HTTP request of the learning data by the parameter extraction unit 121 is "img.jpg" will be considered. In such a case, the parameter value conversion unit 122 divides the "img.jpg" into three character strings of (img,.,jpg) and converts the (img,.,jpg) into a class of (alpha,symbol,alpha), as illustrated in (1) of FIG. 4. In addition, the alpha indicates the alphabet and the symbol indicates a symbol.

When information, in which the path parts, the parameter names, and the character class sequences indicating the parameter values of the HTTP request of the learning data have been correlated with one another, is received from the parameter value conversion unit 122, the profile storage unit 123 of FIG. 1 stores therein the received information in the storage unit 13 as a profile. For example, the profile is information, in which the character class sequences indicating the parameter values of the parameters and the number of appearances are correlated with each other for each combinations of the path parts and the parameters (the parameter names), respectively, as illustrated in FIG. 5.

For example, in the profile illustrated in FIG. 5, an entry of the first row indicates that the HTTP request with a path part "/index.php", a parameter name "id", and a character class sequence "(AL, NU)" of a parameter value is included in learning data and the number (of appearances) is "200 (times)".

In addition, when a plurality of character class sequences are present for a combination of the same path part and parameter name, the profile storage unit 123 of FIG. 1 may store therein, as a profile, information in which a character class sequence with the highest number of appearances or the highest frequency of appearance between the character class sequences has been correlated as the combination of the path part and the parameter name.

One example will be described. For example, when three character class sequences illustrated in (2) of FIG. 4 are present for the same path part and parameter name, the profile storage unit 123 stores therein, as a profile, information in which (alpha,symbol,alpha) with the highest frequency (100) of appearance among the character class sequences has been correlated with the path part and the parameter name.

The anomaly detection unit 124 of FIG. 1 refers to a profile (a global profile) generated by the global profile generation unit 125, and determines whether the HTTP request of the analysis target data is a normal HTTP request.

For example, the anomaly detection unit 124 receives information, in which the path parts, the parameter names, and the character class sequences of the HTTP request of the analysis target data have been correlated with one another, from the parameter value conversion unit 122. Thereafter, the anomaly detection unit 124 calculates similarity between the character class sequence for the combination of the path part and the parameter name of the HTTP request of the analysis target data and the character class sequence for the combination of the path part and the parameter name in the profile.

Thereafter, when the calculated similarity is equal to or more than a predetermined threshold value, the anomaly detection unit 124 determines that the HTTP request of the analysis target data is the normal HTTP request, and when the calculated similarity is smaller than the predetermined threshold value, the anomaly detection unit 124 determines that the HTTP request of the analysis target data is an HTTP request indicating an attack.

One example will be described. First, the parameter value conversion unit 122 converts the parameter value of the HTTP request of the analysis target data extracted by the parameter extraction unit 121 into a character class sequence ((1) of FIG. 6).

Thereafter, the anomaly detection unit 124 calculates similarity between the character class sequence of the HTTP request of the analysis target data and the character class sequence of the profile by Equation (1) ((2) of FIG. 6). That is, the anomaly detection unit 124 calculates the similarity between the character class sequence for the combination of the path part and the parameter name of the HTTP request of the analysis target data and the character class sequence for the combination of the path part and the parameter name in the profile, by Equation (1).

For example, as illustrated in (2) of FIG. 6, the anomaly detection unit 124 sets the length of the character class sequence of the profile as X, the length of the character class sequence of the analysis target data as Y, and the length of the longest common subsequence (LCS) between the character class sequence of the profile and the character class sequence of the analysis target data as Z, and calculates similarity S by Equation (1).

$$\text{Similarity } S = Z/(X+Y-Z) \qquad (1)$$

For example, as illustrated in (2) of FIG. 6, when the anomaly detection unit 124 calculates the similarity between the character class sequence (alpha,numeric,symbol,alpha) of the profile and the character class sequence (alpha,symbol,numeric,symbol,alpha) of the analysis target data, since X=4, Y=5, and Z=4, if these values are put into Equation (1), the similarity S is "0.8".

Next, the anomaly detection unit 124 determines whether the calculated similarity S between the character class sequences is smaller than a threshold value St, and determines that the HTTP request of the analysis target data is anomaly when the similarity S is smaller than the threshold value St ((3) of FIG. 6). That is, the anomaly detection unit 124 determines that the HTTP request of the analysis target data is an attack. On the other hand, when the similarity S is equal to or more than the threshold value St, the anomaly detection unit 124 determines that the HTTP request of the analysis target data is normal. That is, the anomaly detection unit 124 determines that the HTTP request of the analysis target data is not an attack.

For an HTTP request with different path parts but the same parameter name in an HTTP request group of learning data, the global profile generation unit 125 of FIG. 1 generates a profile (a global profile) in which an HTTP request with the same parameter name is aggregated. Hereinafter, a case where the global profile generation unit 125 generates the global profile by using the profile stored by the profile storage unit 123 will be described as an example; however, the present invention is not limited thereto. For example, the global profile generation unit 125 may directly generate the global profile from the HTTP request group of the learning data.

The global profile generation unit 125 includes a global parameter collection unit 126 and a global parameter conversion unit 127.

For each parameter name present in the profile, the global parameter collection unit 126 collects the types of path parts in which the parameter name appears. For example, for a profile before a global parameter conversion process illustrated in FIG. 7, the global parameter collection unit 126 generates a globalized candidate parameter collection list, which indicates a path part in which a parameter (a parameter name) present in the profile appears and the number of types of the path part, for each parameter (each parameter name).

The global parameter conversion unit 127 of FIG. 1 refers to the globalized candidate parameter collection list (see FIG. 7) generated by the global parameter collection unit 126, and determines a parameter name, of which the number of types of a path part is equal to or more than a predetermined value, as a parameter name needed to be globalized. Thereafter, the global parameter conversion unit 127 merges (aggregates) an entry of the parameter name determined to be needed to be globalized in the profile into the parameter name.

For example, in a globalized candidate parameter collection list illustrated in FIG. 8, the global parameter conversion unit 127 determines that a parameter name "file" indicated by reference numeral 801 needs to be globalized because the number of types of the path part is equal to or more than a threshold value (for example, "2") of the number of types of the path part. In addition, the global parameter conversion unit 127 determines that parameter names "id" and "cc" need not to be globalized because the number of types of the path part is smaller than the threshold value (for example, "2") of the number of types of the path part.

Thereafter, as illustrated in FIG. 9, the global parameter conversion unit 127 converts the path part in the entry of the parameter name "file" determined to be needed to be globalized in the profile before the global parameter conversion process into "* (wildcard)". Furthermore, in FIG. 9, the global parameter conversion unit 127 aggregates (merges) character class sequences (character class sequences indicated by reference numeral 901 to reference numeral 903) for the parameter name "file" determined to be needed to be globalized into character class sequences indicated by the reference numeral 901 and reference numeral 904.

For example, the global parameter conversion unit 127 keeps the character class sequence indicated by the reference numeral 901 of FIG. 9 as is (the number of appearances of the character class sequence is also inherited), but merges the character class sequences indicated by the reference numeral 902 and the reference numeral 903 into the character class sequence indicated by the reference numeral 904 because they are the same character class sequences. In addition, the global parameter conversion unit 127 may sum the number of appearances of the character class sequences indicated by the reference numeral 902 and the reference numeral 903 when merging them.

When the global parameter conversion unit 127 generates the global profile as described above, the generated global profile is stored in the storage unit 13. Thereafter, the anomaly detection unit 124 performs anomaly detection for the HTTP request of the analysis target data by using the global profile (profile) stored in the storage unit 13.

The storage unit 13 stores therein the profile generated by the control unit 12. After the global parameter conversion process of the profile is performed by the global profile generation unit 125, the global profile (see FIG. 2) is stored. Furthermore, the storage unit 13 may further store therein the detection result of the HTTP request of the analysis target data.

Processing Procedure

Next, an example of a processing procedure when the attack detection device 10 generates the global profile will be described using FIG. 10. It is assumed that the attack detection device 10 starts the generation of the global profile when the profile is generated or updated by the profile storage unit 123 after the input of the HTTP request of learning data. Furthermore, it is assumed that the generation and storage of the profile, for example, are performed by a processing procedure similar to that disclosed in Patent Literature 1.

First, the global parameter collection unit 126 acquires the profile (see FIG. 2) from the storage unit 13 (S1), and initializes the globalized candidate parameter collection list (see FIG. 8) (S2). After S2, the global parameter collection unit 126 extracts a path part, a parameter name, a character class sequence, and the number of appearances of the first row of the acquired profile (S3: extract path part and parameter information). After S3, the global parameter collection unit 126 determines whether the parameter name of the profile acquired at S3 is a candidate for conversion to a global parameter (S4).

For example, at S4, when the path part of a row taken out from the profile is "*", the global parameter collection unit 126 determines that the row is not the candidate for conversion to the global parameter because the row has already been converted to the global parameter (No at S4), and returns to S3. Then, the global parameter collection unit 126 processes the next row of the profile acquired at S1. On the other hand, when the path part of the row taken out from the profile is other than "*" (Yes at S4), the global parameter collection unit 126 determines that the row is the candidate for conversion to the global parameter and proceeds to S5.

In the case of Yes at S4, the global parameter collection unit 126 updates the globalized candidate parameter collection list (see FIG. 8) (S5). For example, the global parameter collection unit 126 confirms whether a combination of the parameter name and the path part included in the row determined at S4 as the candidate for conversion to the global parameter is already present in the globalized candidate parameter collection list, and performs one of the following update processes (a) and (b) for the globalized candidate parameter collection list.

(a) When neither the parameter name nor the path part is present in the globalized candidate parameter collection list, the global parameter collection unit 126 newly generates an entry of the combination of the parameter name and the path part in the globalized candidate parameter collection list. Then, the global parameter collection unit 126 sets the number of types of the path part in the entry to "1".

(b) When the parameter name is present in the globalized candidate parameter collection list but the path part is not present, the global parameter collection unit 126 adds the path part to the entry of the parameter name of the globalized candidate parameter collection list. Then, the global parameter collection unit 126 adds the value of the number of types of the path part in the entry.

When the combination of the parameter name and the path part is already present in the globalized candidate parameter collection list, the global parameter collection unit 126 does not add the parameter name and the path part to the globalized candidate parameter collection list.

After S5, when there is an unprocessed row in the profile acquired at S1 (No at S6), the global parameter collection unit 126 returns to S3, and when there is no unprocessed row in the profile acquired at S1 (Yes at S6), the global parameter collection unit 126 proceeds to S7 and outputs the globalized candidate parameter collection list (S7).

After S7, the global parameter conversion unit 127 acquires the globalized candidate parameter collection list (S8). Thereafter, the global parameter conversion unit 127 extracts the parameter name, the path part, and the number of types of the path part of the globalized candidate parameter collection list (S9: extract parameter and path part information). When the number of types of the path part for the extracted parameter name is equal to or more than a predetermined threshold value, the global parameter conversion unit 127 determines the parameter name as a parameter name that needs to be globalized (Yes at S10) and proceeds to S11. That is, when a path part corresponding to the parameter name, the type of the path part being equal to or more than the predetermined threshold value, is present in the globalized candidate parameter collection list, the global parameter conversion unit 127 determines the parameter name as the parameter name that needs to be globalized.

On the other hand, when the number of types of the path part for the extracted parameter name is smaller than the predetermined threshold value, the global parameter conversion unit 127 determines that the parameter name is not the parameter name that needs to be globalized (No at S10), and performs the process of S9 on the next row of the globalized candidate parameter collection list.

For example, when the threshold value of the types of the path part is 2, the global parameter conversion unit 127 determines that the parameter names "id" and "cc" in the globalized candidate parameter collection list illustrated in FIG. 8 need not to be globalized, and determines that the parameter name "file" needs to be globalized.

In the case of Yes at S10 of FIG. 10, the global parameter conversion unit 127 updates the profile (S11). Specifically, the global parameter conversion unit 127 merges an entry of the parameter name needed to be globalized in the profile into the parameter name.

For example, the global parameter conversion unit 127 converts the path part in the entry of the parameter name into "*". Furthermore, the global parameter conversion unit 127 aggregates a character class sequence in the entry of the parameter name.

For example, as illustrated in FIG. 9, the global parameter conversion unit 127 converts the path part for the parameter name "file" in the profile before the global parameter conversion process into "*", and aggregates the character class sequences indicated by the reference numeral 901 to the reference numeral 903 for the parameter name "file" into the character class sequence indicated by the reference numeral 901 and the character class sequence indicated by the reference numeral 904.

In addition, the global parameter conversion unit 127 processes the number of appearances of a character class sequence in entries to be converted to the global parameter in the profile in the following manner. That is, the global parameter conversion unit 127 sums the number of appearances of the character class sequence for an entry with the same character class sequence between the entries to be converted to the global parameter, and inherits the number of appearances of the character class sequence for an entry with no same character class sequence between the entries to be converted to the global parameter.

For example, as illustrated in FIG. 9, the global parameter conversion unit 127 inherits the number of appearances of the character class sequence indicated by the reference numeral 901 in the profile before the global parameter conversion process as is in the profile after the global parameter conversion process. On the other hand, the global parameter conversion unit 127 sums the number of appearances of the character class sequences indicated by the reference numeral 902 and the reference numeral 903 in the profile before the global parameter conversion process, and sets the summed number as the number of appearances indicated by the reference numeral 904 in the profile after the global parameter conversion process.

After S11 of FIG. 10, when there is an unprocessed row in the globalized candidate parameter collection list acquired at S8 (No at S12), the global parameter conversion unit 127 returns to S9, and when there is the unprocessed row in the profile acquired at S8 (Yes at S12), the global parameter conversion unit 127 proceeds to S13 and deletes the globalized candidate parameter collection list (S13).

With the above processing, the attack detection device 10 generates a profile (a global profile) in which entries with different path parts but the same parameter name are aggregated in a profile. Thus, for example, even when a profile is generated using an HTTP request in which a path part dynamically changes as learning data, the attack detection device 10 can suppress the insufficiency of the number of types of a parameter value for a parameter name in the profile. As a consequence, the attack detection device 10 can reduce erroneous detection when detecting an attack by using the profile.

Furthermore, for example, the attack detection device 10 can generate a profile applicable to a path part that is generated only once, so that it is possible to reduce the missing of an attack by using the profile. Moreover, the attack detection device 10 can reduce the size of the profile, so that it is possible to reduce a time required for collating an HTTP request to be analyzed and the profile when an attack is detected by using the profile.

Second Embodiment

At S11 of FIG. 10, when aggregating character class sequences correlated with the same parameter name, the global parameter conversion unit 127 may aggregate not only the same character class sequence but also a character class sequence with similarity equal to or more than a predetermined threshold value. In order to calculate the similarity, for example, an edit distance between character class sequences is used. Furthermore, as a method for aggregating the character class sequences, a longest common subsequence is used.

For example, a case will be considered where the global parameter conversion unit 127 uses an edit distance between character class sequences to calculate similarity and a character class sequence group with an edit distance smaller than "3" is to be aggregated. In such a case, as illustrated in FIG. 11, an edit distance between a character class sequence indicated by reference numeral 1101 and a character class sequence indicated by reference numeral 1102 for the parameter name "file" in the profile before the global parameter conversion process is "2".

Consequently, the global parameter conversion unit 127 determines that the character class sequence indicated by the reference numeral 1101 and the character class sequence indicated by the reference numeral 1102 are similar to each other and aggregates these character class sequences. In the case of using the longest common substring to aggregate the character class sequences, the global parameter conversion unit 127 aggregates the character class sequence indicated by the reference numeral 1101 and the character class sequence indicated by the reference numeral 1102 into (AL, NU, SY, AL), which is the longest common substring of these character class sequences. Furthermore, the global parameter conversion unit 127 sums the number of appearances of the character class sequence indicated by the reference numeral 1101 and the character class sequence indicated by the reference numeral 1102, and sets the summed number to the number of appearances "3" indicated by reference numeral 1103.

By so doing, the attack detection device 10 can further reduce the size of the profile (the global profile), so that it is possible to reduce a time required for collating an HTTP request to be analyzed and the profile when an attack is detected by using the profile.

Third Embodiment

Furthermore, the global parameter conversion unit 127 may set a character class sequence with a low number of appearances or a low appearance ratio as a non-aggregation target when generating the global profile. For example, in the first embodiment or the second embodiment, the global parameter conversion unit 127 obtains a relative appearance ratio in a character class sequence group serving as an aggregation candidate with respect to each character class sequence serving as an aggregation candidate. Then, the global parameter conversion unit 127 sets a character class sequence with an appearance ratio lower than a predetermined threshold value as a non-aggregation target.

For example, a case will be considered where the global parameter conversion unit 127 sets a character class sequence with a relative appearance ratio, which is smaller than 5% in the character class sequence group serving as an aggregation candidate, as a non-aggregation target. In such a case, as illustrated in FIG. 12, among character class sequences indicated by reference numeral 1201 to reference numeral 1203 for the parameter name "file" in the profile before the global parameter conversion process, the character class sequence indicated by the reference numeral 1203 is set as a non-aggregation target by the global parameter conversion unit 127 because the appearance ratio of the character class sequence indicated by the reference numeral 1203 is smaller than 5% in the character class sequence group serving as an aggregation candidate. On the other hand, the character class sequence indicated by the reference numeral 1201 and the character class sequence indicated by the reference numeral 1202 are set as aggregation targets because the appearance ratios of the character class sequences indicated by the reference numeral 1201 and the reference numeral 1202 are equal to or more than 5% in the character class sequence group serving as an aggregation candidate.

As described above, the global parameter conversion unit 127 sets a character class sequence with a low number of appearances as a non-aggregation target when generating the global profile. In this way, even when a profile includes a result of learning an HTTP request having a parameter value erroneously input or an HTTP request indicating an attack, the attack detection device 10 can prevent the result of the learning from being reflected in the global profile. As a consequence, the attack detection device 10 can improve the accuracy of attack detection using the global profile.

In addition, the global parameter conversion unit 127 may delete information on a character class sequence with a low number of appearances or a low appearance ratio as described above after generating the global profile similar to that of the first embodiment or the second embodiment.

Other Embodiments

When generating the global profile, if there are entries in which path parts are different but the similarity of parameter names is equal to or more than a predetermined value, the global parameter conversion unit 127 may also set the entry as an aggregation target. By so doing, the attack detection device 10 can further reduce the size of a profile (the global profile).

So far, the case where the attack detection device 10 uses the HTTP request to the web server (site) as learning data and analysis target data has been described as an example; however, an access request other than the HTTP request may also be used.

Moreover, the attack detection device 10 may apply the aggregation of the entries in which path parts are different but a parameter name is the same to the generation of a profile to be used in so-called signature-based detection. For example, the attack detection device 10 acquires an HTTP request to be used in malicious communication as learning data, and generates a profile by aggregating parameter values (or character class sequences indicating the parameter values) in an HTTP request, in which path parts are different but a parameter name is the same, from the acquired HTTP request. Then, the attack detection device 10 performs the signature-based detection for the HTTP request of analysis target data by using the profile.

Computer Program

Furthermore, a computer program for performing the function of the attack detection device 10 described in each embodiment can be installed in a desired information processing device (computer). For example, the aforementioned computer program provided as package software or on-line software is executed in the information processing device, so that the information processing device can serve as the attack detection device 10. The information processing device described herein includes desktop-type or laptop-type personal computers. In addition, mobile communication terminals such as smart phones, cellular phones, or personal handyphone systems (PHSs), and personal digital assistants (PDAs) are included in the category of the information processing device. Furthermore, the attack detection device 10 may be implemented in a cloud server.

Figure 13:
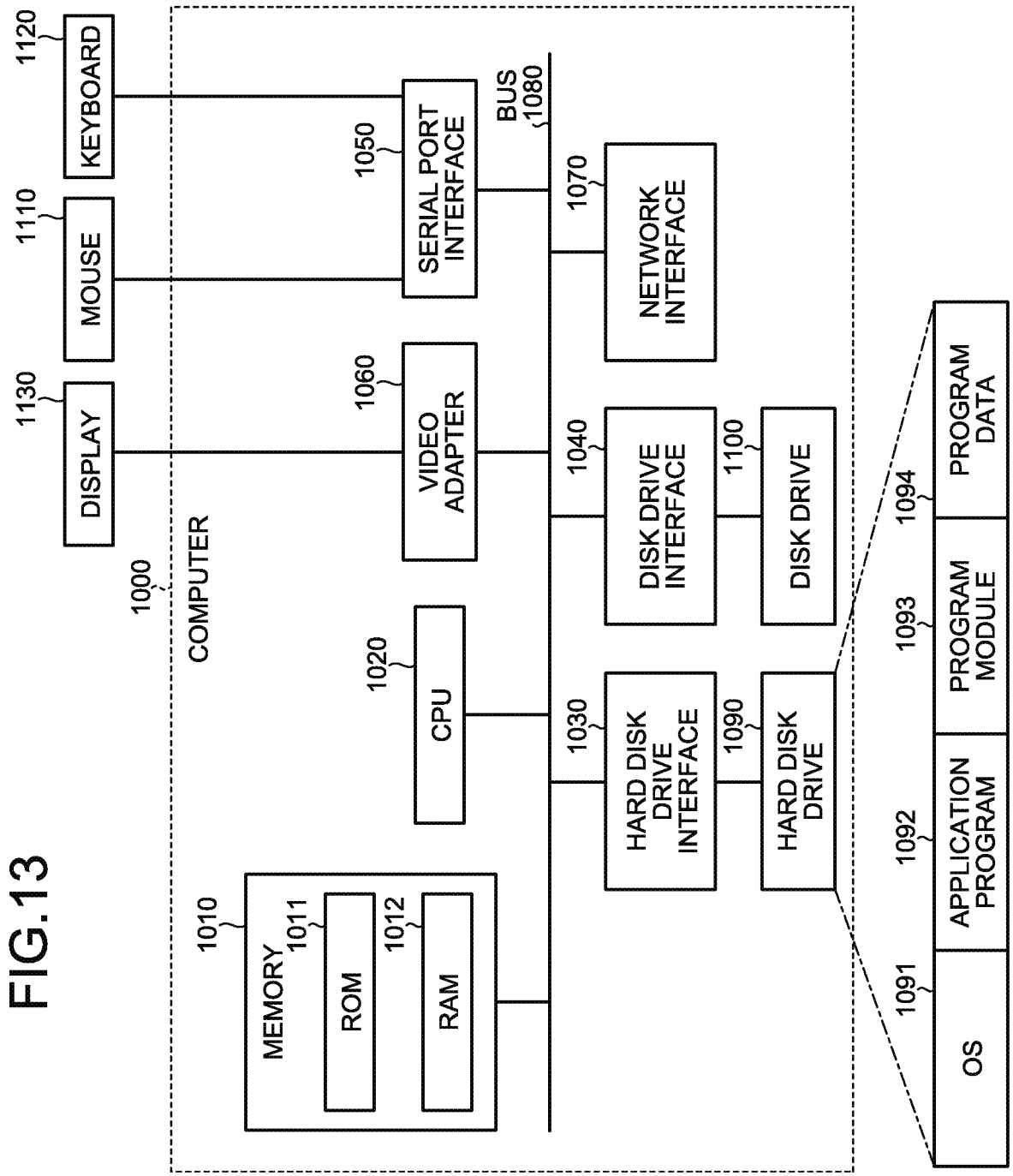
FIG. 13 is a diagram illustrating a computer that executes an attack detection program.

Hereinafter, an example of a computer that executes the aforementioned computer program (an attack detection program) will be described. FIG. 13 is a diagram illustrating the computer that executes the attack detection program. As illustrated in FIG. 13, a computer 1000, for example, has a memory 1010, a central processing unit (CPU) 1020, a hard disk drive interface 1030, a disk drive interface 1040, a serial port interface 1050, a video adapter 1060, and a network interface 1070. These elements are connected to one another via a bus 1080.

The memory 1010 includes a read only memory (ROM) 1011 and a random access memory (RAM) 1012. The ROM 1011, for example, stores therein a boot program such as a basic input output system (BIOS). The hard disk drive interface 1030 is connected to a hard disk drive 1090. The disk drive interface 1040 is connected to a disk drive 1100. A removable storage medium such as a magnetic disk or an optical disc is inserted into the disk drive 1100. For example, a mouse 1110 and a keyboard 1120 are connected to the serial port interface 1050. For example, a display 1130 is connected to the video adapter 1060.

As illustrated in FIG. 13, the hard disk drive 1090, for example, stores therein an OS 1091, an application program 1092, a program module 1093, and program data 1094. Various types of data and information described in the aforementioned embodiments, for example, are stored in the hard disk drive 1090 and the memory 1010.

Furthermore, the CPU 1020 reads the program module 1093 and the program data 1094 stored in the hard disk drive 1090 to the RAM 1012 as necessary and performs the aforementioned each procedure.

In addition, the program module 1093 and the program data 1094 related to the aforementioned attack detection program are not limited to being stored in the hard disk drive 1090, and for example, may be stored in a removable storage medium and read by the CPU 1020 via the disk drive 1100 and the like. Alternatively, the program module 1093 and the program data 1094 related to the aforementioned computer program may be stored in other computers connected via a network such as a local area network (LAN) or a wide area network (WAN), and read by the CPU 1020 via the network interface 1070.

REFERENCE SIGNS LIST

10 attack detection device
11 input unit
12 control unit
13 storage unit
111 learning data input unit
112 analysis target data input unit
121 parameter extraction unit
122 parameter value conversion unit
123 profile storage unit
124 anomaly detection unit
125 global profile generation unit
126 global parameter collection unit
127 global parameter conversion unit

The invention claimed is:

1. A profile generation device that generates a profile indicating characteristics of a request to a web server, the request being a detection target, the profile generation device comprising:
a memory; and
a processor coupled to the memory and programmed to execute a process comprising:
acquiring profile information including a combination of path parts and parameters included in a request that is learning data; and
when a group of the acquired profile information includes a predetermined number or more of profile information in which the path parts are different but similarity between names of the parameters is equal to or more than a predetermined value, generating a profile in which the group of the profile information is aggregated,
wherein the similarity is determined in accordance with a length Z of a longest common subsequence between a character class sequence of the profile, the character class sequence of the profile having a length X, and a character class sequence of the detection target, the character class sequence of the detection target having a length Y, such that the similarity S is given by $$S = Z/(X+Y-Z), \text{ and}$$

wherein the character class sequence of the profile is a sequence in which characters constituting the parameters are classified into classes including as AL (a character class (alpha) representing an alphabet), NU (a character class (numeric) representing a numeral), or SY (a character class (symbol) representing a symbol), and classification results are arranged according to an arrangement of character strings.

2. The profile generation device according to claim 1, wherein, when the group of the acquired profile information includes a predetermined number or more of profile information groups in which the path parts are different but the names of the parameters are equal to each other, setting the profile information group, in which the names of the parameters are equal to each other, as an aggregation target.

3. The profile generation device according to claim 1, wherein, when aggregating a profile information group in which the similarity between the names of the parameters is equal to or more than the predetermined value, aggregating a profile information group in which similarity between parameter value information included in the profile information group is equal to or more than a predetermined value.

4. The profile generation device according to claim 3, wherein, when aggregating a profile information group in which the similarity between the names of the parameter is equal to or more than the predetermined value, setting, as a non-aggregation target, parameter value information in which the number of appearances or an appearance ratio of the parameter value information in the profile information group is smaller than the predetermined value.

5. The profile generation device according to claim 1, wherein, when aggregating a profile information group in which the similarity between the names of the parameter is equal to or more than the predetermined value, setting a wildcard as a path part in a profile information group to be aggregated in the profile.

6. The profile generation device according to claim 1, wherein the profile is information in which the path parts included in the request, the names of the parameters, and parameter value information of the parameters are correlated with one another.

7. An attack detection device that detects an attack by using a profile indicating characteristics of a request to a web server, the request being a detection target, the attack detection device comprising:
a memory; and
a processor coupled to the memory and programmed to execute a process comprising:
acquiring profile information including a combination of path parts and parameters included in a request that is learning data;
when a group of the acquired profile information includes a profile information group in which the path parts are different but similarity between names of the parameters is equal to or more than a predetermined value, generating a profile in which the profile information group is aggregated;

acquiring a request that is an attack detection target; and detecting whether the request is an attack by comparing path parts and parameters in the request that is the attack detection target with the combination of the path parts and the parameters indicated in the profile, wherein the similarity is determined in accordance with a length Z of a longest common subsequence between a character class sequence of the profile, the character class sequence of the profile having a length X, and a character class sequence of the detection target, the character class sequence of the detection target having a length Y, such that the similarity S is given by $S=Z/(X+Y-Z)$, and wherein the character class sequence of the profile is a sequence in which characters constituting the parameters are classified into classes including as AL (a character class (alpha) representing an alphabet), NU (a character class (numeric) representing a numeral), or SY (a character class (symbol) representing a symbol), and classification results are arranged according to an arrangement of character strings.

8. A profile generation method using a profile generation device that generates a profile indicating characteristics of a request to a web server, the request being a detection target, the profile generation method comprising:

acquiring profile information including a combination of path parts and parameters included in a request that is learning data; and generating, when a group of the acquired profile information includes a predetermined number or more of profile information in which the path parts are different but similarity between names of the parameters is equal to or more than a predetermined value, a profile in which the group of the profile information is aggregated, wherein the similarity is determined in accordance with a length Z of a longest common subsequence between a character class sequence of the profile, the character class sequence of the profile having a length X, and a character class sequence of the detection target, the character class sequence of the detection target having a length Y, such that the similarity S is given by $S=Z/(X+Y-Z)$, and wherein the character class sequence of the profile is a sequence in which characters constituting the parameters are classified into classes including as AL (a character class (alpha) representing an alphabet), NU (a character class (numeric) representing a numeral), or SY (a character class (symbol) representing a symbol), and classification results are arranged according to an arrangement of character strings.

9. A non-transitory computer-readable recording medium having stored a profile generation program that generates a profile indicating characteristics of a normal request to a web server, the request being a detection target, and causes a computer to execute a process comprising:

acquiring profile information including a combination of path parts and parameters included in a request that is learning data; and generating, when a group of the acquired profile information includes a predetermined number or more of profile information in which the path parts are different but similarity between names of the parameters is equal to or more than a predetermined value, a profile in which the group of the profile information is aggregated, wherein the similarity is determined in accordance with a length Z of a longest common subsequence between a character class sequence of the profile, the character class sequence of the profile having a length X, and a character class sequence of the detection target, the character class sequence of the detection target having a length Y, such that the similarity S is given by $S=Z/(X+Y-Z)$, and wherein the character class sequence of the profile is a sequence in which characters constituting the parameters are classified into classes including as AL (a character class (alpha) representing an alphabet), NU (a character class (numeric) representing a numeral), or SY (a character class (symbol) representing a symbol), and classification results are arranged according to an arrangement of character strings.

* * * * *